United States Patent Office 3,445,214
Patented May 20, 1969

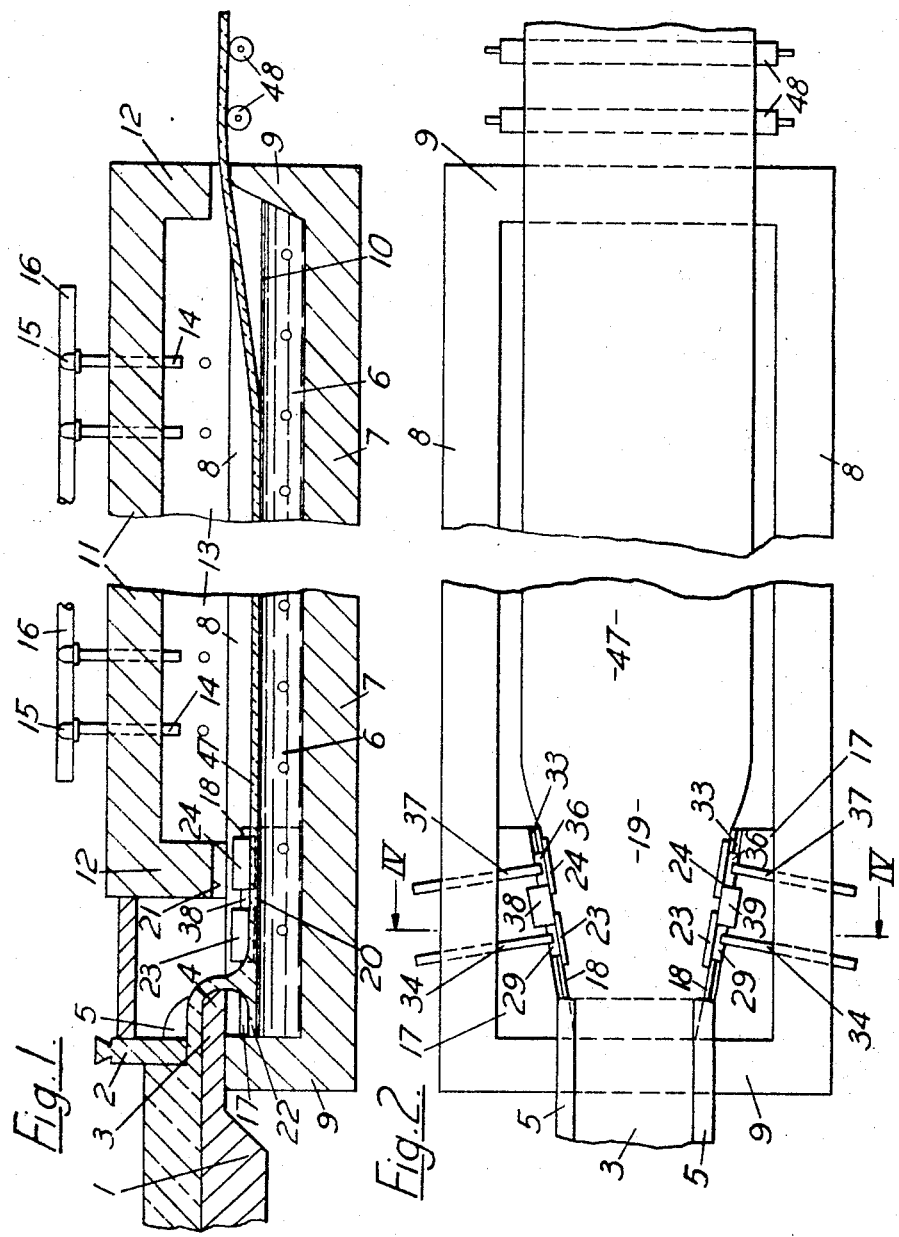

3,445,214
METHOD AND APPARATUS FOR ELECTRICAL VISCOSITY CONTROL OF FLOAT GLASS
Edward Russell Ormesher, Rainford, England, assignor to Pilkington Brothers Limited, Liverpool, England, a corporation of Great Britain
Filed Mar. 1, 1966, Ser. No. 530,910
Claims priority, application Great Britain, Mar. 3, 1965, 9,146/65
Int. Cl. C03c 23/00; C03b 7/00, 5/30
U.S. Cl. 65—99                                10 Claims

ABSTRACT OF THE DISCLOSURE

A layer of molten glass is supported on a molten metal surface and electric current is passed through the thickness of an area of the glass with the molten metal acting as one electrode, so that the area is thermally conditioned.

---

Figure 3:
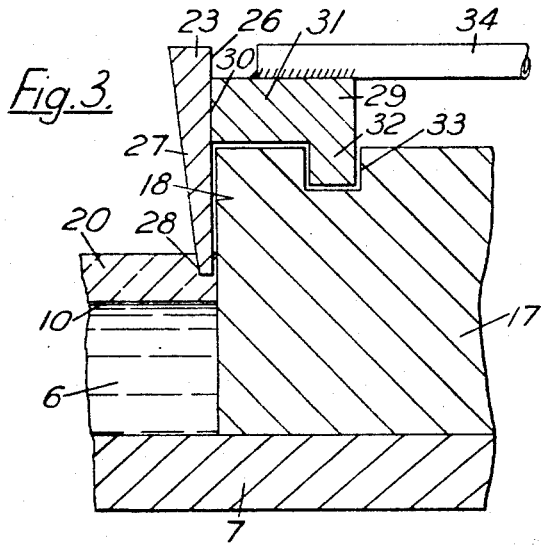

This invention relates to the manufacture of flat glass during which glass is in contact with molten metal.

More especially the invention relates to the manufacture of flat glass during which glass in ribbon form is advanced along a molten bath having a specific gravity greater than the glass and presenting a substantially frictionless surface to the glass.

The molten bath is preferably a bath of molten metal, for example molten tin or a tin alloy having a specific gravity greater than glass. For example the bath is so constituted as to have all the characteristics fully described in U.S. Pat. Nos. 2,911,759 and 3,083,551.

In the methods described in those patents there are temperature regulators associated with the bath of molten metal which control the thermal condition of the glass as it is advanced in ribbon form along the bath of molten metal. These temperature regulators control the overall thermal condition of the glass ribbon.

It is a main object of the present invention to provide localised control of the temperature and consequently of the viscosity of molten glass on a bath of molten metal.

Another object of the invention is to provide improved control of molten glass as the glass is advanced along the inlet end of a bath of molten metal.

According to the invention, from its broadest aspect, there is provided in the manufacture of flat glass in ribbon form during which molten glass is in contact with molten metal, the step of thermally conditioning a defined area of the glass by passing an electric current through the thickness of the molten glass in that area.

Hot glass is a sufficiently good conductor of electricity to enable an electric current to be passed through the glass, the intensity of which current can be sufficient to cause electrical resistance heating of the region of the glass through which the current is passed.

When molten glass in ribbon form is being advanced along a bath of molten metal some adjustment of the temperature of a defined area of the ribbon may be desirable in order to give improved control of the overall viscosity of a region of the ribbon, for example to maintain the viscosity of the glass uniform across the whole width of the ribbon. Localised supply of heat to the glass, particularly to minimise heat losses from the margins of the ribbon, may be effected according to the invention by passing a heating electric current through the thickness of the margins of the molten glass.

Such localised heat supply to the margins of the glass has been found to be particularly efficacious at the inlet end of the bath in methods of manufacturing flat glass in ribbon form on a bath of molten metal in which the molten glass poured onto the bath is initially contained as an advancing body of molten glass before lateral flow of the glass is permitted.

From this aspect a preferred embodiment of the invention provides a method of manufacturing flat glass in ribbon form comprising pouring molten glass onto a bath of molten metal at a controlled rate to establish a body of molten glass on the bath, containing that body of molten glass as it is advanced, controlling the thermal condition of the contained body of molten glass by passing an electric current through the thickness of the margins of the body, which current is so regulated as to minimise heat losses from the margins of the body, then permitting lateral flow of the molten glass in order to form from the body of molten glass an advancing layer of molten glass in ribbon form, and cooling the ribbon sufficiently to enable it to be taken unharmed from the bath.

In one process to which the present invention may be applied the thermal condition of the body of molten glass and of the molten glass advancing from said body, may be so controlled as to permit free lateral flow of the molten glass to the limit of its free flow in order to develop a buoyant layer of molten glass in ribbon form which is subsequently cooled as it is advanced until it is sufficiently stiffened to be taken unharmed off the bath by mechanical means.

Alternatively the lateral flow of the molten glass may be arrested when the glass has achieved a predetermined thickness so that the ultimate ribbon of flat glass discharged from the bath is thicker than the glass produced when free lateral flow is permitted.

The contact of the glass with the molten metal of the bath provides a good electrical connection to the underface of the ribbon of glass, and preferably the electrical connections are such that separately controlled electric currents are respectively passed through the thickness of both margins of the molten glass.

Glass may be locally heated by the method of the invention anywhere on the bath where the glass is hot enough to permit good electrical contact to be made with the glass. The invention also provides in the manufacture of flat glass during which the glass is advanced along a bath of molten metal, the steps of delivering molten glass at a controlled rate to the bath of molten metal and advancing the molten glass along the bath in ribbon form, permitting the molten glass delivered to the bath to flow in a direction away from the advancing glass to form a heel, and controlling the thermal condition of the heel by passing a regulated electric current through the thickness of the molten glass in the heel.

The invention also comprehends apparatus for use in the manufacture of flat glass in ribbon form, including an elongated tank structure containing a bath of molten metal, means for pouring molten glass onto the bath at a controlled rate and advancing the glass along the bath, thermal regulators for thermally conditioning the molten glass as it is advanced, at least one electrode so mounted relative to the tank structure as to dip into the molten glass on the bath, and an electric current supply circuit connected to said electrode and to the molten metal bath in and including current regulating means whereby the heating electric current passing through the thickness of the molten glass can be regulated.

Further the invention provides apparatus for use in the manufacture of flat glass in ribbon form including an elongated tank structure containing a bath of molten metal, means for pouring molten glass onto the bath at a controlled rate and advancing the glass along the bath, thermal regulators for thermally conditioning the molten glass as it is advanced, restricting walls extending along the bath to contain the molten glass as it is poured onto the bath and advanced as a body of molten glass between said restricting walls, electrodes so mounted on said restricting walls as to dip into the margins of said contained body of molten glass and an electric current supply circuit connected to said electrodes and to the molten metal bath so as to pass heating electric current through the thickness of the margins of the body of molten glass, said circuit including means for regulating the current whereby the temperature of the margins of the body of molten glass is regulated as the body is advanced between said restricting walls.

Preferably a spout extends over one end of the tank structure for pouring molten glass onto the bath, the restricting walls extend into the bath as laterally spaced extensions of the side jambs of the spout, and the electrodes comprise blocks of electrically conductive material supported in front of the restricting walls and spaced above the molten metal surface.

In a preferred embodiment of the invention there are two pairs of electrodes, the electrodes of each pair being mounted side-by-side in front of one of the restricting walls, and separate current supply circuits one for each electrode, each said current supply circuit including adjustable current control means, whereby the current flowing through the two margins of the glass can be separately controlled.

In another application of the invention for control of the tendency to devitrification in the heel of molten glass existing under the spout which extends over an end wall of the tank structure and is spaced from the surface level of the bath, heating current is passed through the thickness of the heel of molten glass by an electrode mounted on the tank end wall so as to dip into the heel of molten glass.

The invention also comprehends flat glass produced by a method as described above and sheets of glass cut therefrom.

Figure 4:
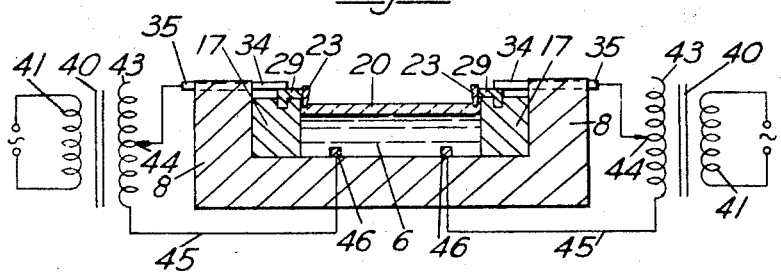
Figure 5:
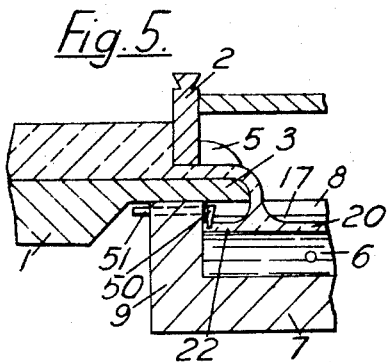

In order that the invention may be more clearly understood some embodiments thereof will now be described, by way of example, with reference to the accompanying drawings in which:

FIGURE 1 is a central longitudinal sectional elevation of apparatus according to the invention, comprising an elongated tank structure containing a bath of molten metal, and a superimposed roof structure, and showing the position of electrodes for making electrical connection with the margins of molten glass at the inlet end of the bath, FIGURE 2 is a plan view of the tank structure of FIGURE 1, FIGURE 3 is a detailed elevation of one of the electrodes, FIGURE 4 is a section on line IV—IV of FIGURE 2, showing electrical circuits connected to the electrodes, and FIGURE 5 shows a sectional view of the inlet end of the tank structure with an electrode fixed into the inlet end wall of the tank structure.

Referring to FIGURES 1 and 2 of the drawings, a forehearth of a continuous glass melting furnace is indicated at 1 and a regulating tweel at 2. The forehearth ends in a spout 3 comprising a lip 4 and side jambs 5 which form with the lip a spout of generally rectangular cross-section. A cover is fitted over the spout in well known manner.

The spout 3 is disposed over one end of a tank structure which contains a bath 6 of molten metal, for example molten tin or molten tin alloy having a specific gravity greater than the specific gravity of molten glass. The tank comprises a floor 7, side walls 8 and end walls 9. The level of the surface of the bath 6 of molten metal is indicated at 10.

The tank structure supports a roof structure bridging the bath and including a roof 11, end walls 12 and side walls 13 so that the roof structure provides a tunnel over the bath and defines a headspace over the bath. A protective atmosphere is fed into the headspace through ducts 14 which are connected by headers 15 to a main supply conduit 16. The protective atmosphere is maintained at a plenum in the headspace as a protection against the ingress of ambient atmosphere into the headspace over the bath.

In the tank structure at the inlet end of the bath there is a fixed refractory wall structure 17, of a high quality refractory, which extends to the full depth of the tank and may be built into the tank structure as a permanent fixture. The inside faces 18 of the wall structure are splayed outwardly and define a gradually widening passage 19 beginning beneath the spout 3 at the inlet end of the bath. The surfaces 18 act as restricting walls which constitute laterally spaced extensions of the side jambs 5 of the spout. The restricting walls 18 contain the molten glass poured onto the bath as a body of molten glass 20 which advances down the passage 19 between the restricting walls 18. The end wall 12 of the roof structure at the inlet end of the bath terminates just above the wall structure 17, thereby defining an inlet 21 through which the molten glass 20 is advanced along the bath 6 of molten metal.

The spout 3 is disposed in overlapping relation with the tank structure so that the lip 4 of the spout is disposed over the molten metal, and molten glass flowing from the glass melting furnace over the spout 3 is caused to have a free fall of several inches to the level of the bath surface. The undersurface of the molten glass which has been in contact with the surface of the spout flows rearwardly to form a heel of molten glass 22 under the spout 3.

The molten glass delivered to the bath 6 from the spout 3 immediately tends to spread on the surface of the molten metal, but the molten glass is initially contained against such spreading by the restricting walls 18.

In order to minimise heat losses from the margins of the body of molten glass 20 due to heat exchange between the glass and the restricting walls 18, and to control the thermal condition of the body 20 of molten glass, electrical heating of the margins of the body of molten glass is provided by the present invention.

In the embodiment illustrated a pair of electrodes 23 and 24 is mounted in front of each of the restricting walls 18. One of the electrodes 23 is illustrated in greater detail in FIGURE 3 and comprises a rectangular plate having a tapering cross section, of an electrically-conductive material which is resistant to attack by molten glass. A preferred material is molybdenum. The back face 26 of the plate 23 fits flush against the restricting wall surface 18, and the front face 27 of the plate 23 tapers downwardly so that the bottom edge 28 of the plate is the thinnest part of the plate.

The electrode plate 23 is fixed to an angled backing block 29, the plate 23 being fixed to the face 30 of one leg 31 of the block 29 by means of bolts (not shown), or by being welded to the face 30 of the block 29. The other leg 32 of the block 29 fits downwardly into a groove 33 formed in the top of the wall structure 17. The block 29 is made of heat resisting steel and a supporting bar 34 also of heat resisting steel is welded to the block 29. The fitting of the leg 32 of the block 29 into the groove 33 ensures that the electrode plate 23 is correctly positioned in front of the restricting wall 18 with the bottom edge 28 of the electrode plate 23 spaced above the surface level 10 of the bath 6 of molten metal by a distance such that the lower edge of the plate 23 dips into a margin of the molten glass 20.

The outer end of the bar 34 is surrounded by insulation 35, as shown in FIGURE 4, where the bar 34 passes through a side wall 8 of the tank structure.

FIGURE 4 illustrates the disposition of the two electrodes 23 opposite each other. The other pair of electrodes 24 are identical in construction and mounting. Each electrode 24 is also in the form of a rectangular plate, for example of molybdenum, which dips into a margin of the molten glass and is mounted on a backing block 36 carried on one end of a supporting bar 37, both the block 36 and the bar 37 being of heat resisting steel. The bars 37 are mounted in the side walls 8 of the tank structure in the same manner as the bars 34.

Spacer tiles respectively 38 and 39 are fixed to the wall structure 17 between the backing blocks 29 and 36 of each pair of electrodes in order to ensure the correct spacing between the two blocks 29 and 36 so that the two electrode plates 23 and 24 are correctly mounted side-by-side but spaced apart in front of each of the restricting walls.

Four separate current supply circuits are provided, one for each electrode. Two of the circuits for supplying the electrodes 23 are shown in FIGURE 4. Alternatively there may only be two supply circuits, one for each pair of electrodes 23 and 24.

Each current supply circuit comprises an auto-transformer 40 whose primary winding 41 has terminals for connection to a source of alternating current. The secondary winding 43 of each auto-transformer has a sliding contact 44 which, in the embodiment shown in FIGURE 4, is connected to the supporting bar 34 of the appropriate electrode 23. One end of the secondary winding 43 is connected by a line 45 to an electrode 46 submerged in the molten metal bath.

The heating electric currents supplied by the two auto-transformers 40 flow through the margins of the body 20 of molten glass, from the electrode plate 23 to the molten metal of the bath. Identical current supply circuits are individually connected to the electrodes 24. The molten metal provides good electrical contact with the lower face of the glass. By the provision of separate current supply circuits the currents flowing through the two margins of the glass via the electrodes 23 and 24 can be individually controlled by independent adjustment of the sliding contacts 44 of the auto-transformers. This independent adjustment of the currents supplied to the two margins of the glass may be used to balance the contour of the body of molten glass advancing between the restricting walls 18 especially in the manufacture of glass of 7 mm. thickness or more. The thinner side of the body of molten glass 20 is thickened by increasing the power supplied to that side of the body of molten glass and vice-versa.

In some circumstances independent control of the currents supplied to the electrodes may not be necessary, and both pairs of electrodes may be connected into the same circuit in such a way that the path taken by the current is from one pair of electrodes, through one margin of the glass, through the molten metal, and through the other margin of the glass to the other pair of electrodes.

The current supplied depends on the thickness of the body of molten glass, the depth to which the electrodes are immersed in the glass and the temperature of the glass. It has been found that a power dissipation of from about 2 to 10 kilowatts in each margin of the body of molten glass generally achieves the desired heating through margins of the glass about ½ inch wide. For example a current of the order of 200 amps at 50 volts may be passed through each margin of the glass. In other circumstances much higher currents may be employed, for example currents up to 500 amps.

The molten glass which is contained between the restricting walls 18 settles readily on the bath after delivery from the spout so that it adopts level surfaces both on the undersurface which is in contact with the bath of molten metal and on the upper surface of the body 20 of molten glass. The settling of the molten glass on the bath is enhanced by the application of the invention in controlled localised heating of the margins of the body of molten glass which are in contact with the restricting walls, so that the viscosity of the margins of the body of molten glass can at least be maintained of the same order as the viscosity of the glass at the centre of the body 20. This minimises loss of heat from the margins of the glass and gives more uniform thermal conditions across the body 20 of molten glass.

In some instances, for example when a current of about 200 amps flows, the temperature of the margins of the body 20 of molten glass may reach about 1300° C., the molten glass having been delivered on to the bath at a temperature of about 1000° C. so that there are in effect narrow bands of very hot glass (e. g. ½ inch wide) streaming down the edges of the body of glass against the restricting walls 18. This reduces the viscous drag of the body of molten glass 20 against the refractory walls 18.

Restricting walls, such as the walls 18 herein, which limit the lateral spreading of the molten glass during its initial advance along the surface of the molten metal are described and claimed in co-pending application Ser. No. 525,976, filed Feb. 8, 1966.

In the method illustrated by way of example lateral flow of the molten glass leaving the restricting walls 18 is permitted, as illustrated in FIGURE 2, and as the glass spreads to the limit of its free flow under the influence of gravity and surface tension there is developed a buoyant body 47 of molten glass which is continuously advanced in ribbon form along the bath and is cooled as it is advanced until at the outlet end of the bath, where the temperature is about 600° C., the ribbon can be taken unharmed from the bath by driven rollers 48 disposed at the outlet end of the tank and slightly above the level of the bottom of the outlet from the bath. The driven rollers 48 apply a tractive effort to the glass to take the glass from the bath in ribbon form.

One example of application of the instant invention is directed to the electrical heating of the margins of the glass before it reaches the free flow area.

The invention may however be applied for localised heating of the glass anywhere on the bath where the glass is sufficiently hot to permit good electrical contact to be made to its upper surface.

Referring to FIGURE 5, one or more molybdenum electrodes 50 may be provided dipping into the heel 22 of molten glass formed under the spout 3 by the molten glass which is permitted to flow in a direction away from the advancing glass 20. Each electrode 50 is mounted on a conducting bar 51 which is fixed through the end wall 9 of the tank structure and is connected to an electric current supply circuit of the same kind as is illustrated in FIGURES 3 and 4. The heating of the heel 22 of molten glass by the electric current passing through the thickness of the glass in the heel 22 is regulated so as to control any tendency to devitrification in the heel.

I claim:

1. In the manufacture of flat glass in ribbon form during which a layer of molten glass is supported on a molten metal surface, thermally conditioning a defined area of the glass by passing an electrical current through the thickness of the layer of molten glass in that area between an electrode contacting the upper surface of the layer of molten glass and the molten metal surface on which the layer is supported.

2. In the manufacture of flat glass in ribbon form during which a layer of molten glass is advanced along a supporting bath of molten metal, reducing the viscosity of the margins of the glass as it is advanced by passing a heating electric current through the thickness of the margins of the layer of molten glass between electrodes contacting the upper surface of the margins of the layer of molten glass and the molten metal surface on which the layer is supported.

3. A method of manufacturing flat glass in ribbon form comprising pouring molten glass on to a bath of molten metal at a controlled rate to establish a body of molten glass on the bath, laterally containing that body of molten glass as it is advanced, controlling the thermal condition of the contained body of molten glass by passing an electric current through the thickness of the margins of the body between electrodes dipping into the upper surface of the body and the molten metal bath, which current is so regulated as to minimize heat losses from the margins of the body, then permitting lateral flow of the molten glass in order to form from the body of molten glass an advancing layer of molten glass in ribbon form, and cooling the ribbon sufficiently to enable it to be taken unharmed from the bath.

4. A method according to claim 3, wherein separately controlled electric currents are respectively passed through the thickness of both margins of the body of molten glass.

5. In the manufacture of flat glass in ribbon form during which the glass is advanced along a bath of molten metal, delivering molten glass at a controlled rate to the bath of molten metal and advancing the molten glass along the bath in ribbon form, permitting the molten glass delivered to the bath to flow in a direction away from the advancing glass to form a heel, and controlling the thermal condition of the heel by passing a regulated electric current through the thickness of the molten glass in the heel between an electrode dipping into the surface of the heel and the bath of molten metal.

6. Apparatus for use in the manufacture of flat glass in ribbon form, including an elongated tank structure containing a bath of molten metal, means for pouring molten glass on to the bath at a controlled rate and advancing the glass along the bath, thermal regulators for thermally conditioning the molten glass as it is advanced, at least one electrode so mounted relative to the tank structure as o dip into a defined area of the upper surface of the molten glass on the bath, and an electric current supply circuit connected to said electrode and to the molten metal bath and including current regulating means whereby the heating electric current passing through the thickness of the molten glass can be regulated.

7. Apparatus for use in the manufacture of flat glass in ribbon form, including an elongated tank structure containing a bath of molten metal, means for pouring molten glass on to the bath at a controlled rate and advancing the glass along the bath, thermal regulators for thermally conditioning the molten glass as it is advanced, restricting walls extending along the bath to contain the molten glass as it is poured on to the bath and advanced as a body of molten glass between said restricting walls, electrodes so mounted on said restricting walls as to dip into the upper surface of the margins of said contained body of molten glass and an electric current supply circuit so connected to said electrodes and to the molten metal bath as to pass heating electric current through the thickness of the margins of the body of molten glass, said circuit including means for regulating the current whereby the temperature of the margins of the body of molten glass is regulated as the body is advanced between said restricting walls.

8. Apparatus according to claim 7, wherein a spout extends over one end of the tank structure for pouring molten glass on to the bath, the restricting walls extend into the bath as laterally spaced extensions of the side jambs of the spout, and the electrodes comprise blocks of electrically conductive material supported in front of the restricting walls so as to be spaced from the molten metal surfaces.

9. Apparatus according to claim 8, comprising two pairs of electrodes, the electrodes of each pair being mounted side-by-side in front of one of the restricting walls, and separate current supply circuits, one for each electrode, each said current supply circuit including adjustable current control means, whereby the current flowing through the margins of the glass can be separately controlled.

10. Apparatus according to claim 6, wherein a spout for pouring molten glass on to the bath extends over one end wall of the tank structure, and is spaced from the surface level of the bath, and an electrode is mounted on that tank end wall so as to dip into the heel of molten glass existing on the bath underneath the spout.

References Cited

UNITED STATES PATENTS

| 2,523,030 | 9/1950 | Labino | 65—128 |
| 3,030,434 | 4/1962 | Gell | 65—346 |
| 3,223,503 | 12/1965 | Barradell-Smith et al. | 65—99 |
| 3,231,351 | 1/1966 | Brichard | 65—99 X |
| 3,351,452 | 11/1967 | Robinson | 65—99 |

DONALL H. SYLVESTER, *Primary Examiner.*

R. V. FISHER, *Assistant Examiner.*

U.S. Cl. X.R.

65—65, 162, 182, 326, 346